3,396,222
DECALCIFICATION OF BONES
Archie B. Blackburn, Lake Jackson, Tex., assignor to The Dow Chemical Company, Midland, Mich., a corporation of Delaware
No Drawing. Filed Feb. 3, 1965, Ser. No. 430,179
5 Claims. (Cl. 424—3)

This invention relates to a process for the decalcification of bones by treatment with certain lactones and the hydrolysis products of such lactones. More particularly, the present invention relates to the decalcification of bones and bone-like tissues by contacting the bones or tissues with lactones containing from 3 to 7 carbon atoms and their hydrolysis products.

For biological studies, bones may be decalcified with a wide variety of chemicals, such as nitric, hydrochloric or acetic acids. However, the use of these acids for decalcification is usually unsatisfactory when subsequent histochemical studies are to be made, because extensive destruction of the tissues may result. Various specialized alternative methods which have been used to decalcify bones include electrolytic decalcification and the use of citric acid to prepare bone specimens in which the enzymes have been preserved. Organic chelating agents (ion exchange resins and the sodium salt of ethylenediamine tetraacetic acid, for example) have also been used to decalcify bones prior to slicing the bones to prepare the specimens for microscopic examination. Such treatments generally have the disadvantage of requiring excessive time periods using dilute solutions so that the decalcification does not damage the structure of the tissue. The time required to decalcify a bone specimen by many of these prior art methods is a distinct disadvantage in diagnostic work based on the microscopic examination of bone tissue.

It has now been found that lactones of from 3 to 7 carbon atoms and the hydrolysis products of such lactones may be used to effectively and quickly decalcify bones and bone-like tissues prior to the sectioning or slicing of such tissues for pathological, histological or other scientific examination.

The lactones which are used in the process of the invention may be characterized by the following structural formula

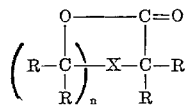

wherein $n$ is an integer of from 0 to 3, each R is independently selected from the group consisting of the hydrogen atom and a lower alkyl group of from 1 to 4 carbon atoms (i.e., a group of the formula $(C_kH_{2k})H$ wherein $k$ is an integer of from 0 to 4), X is an oxygen atom or a group of the formula

(wherein each R is as previously defined) and $n$ is not zero when X is an oxygen atom. The main hydrolysis products obtained from these lactones include lactone polymers and the corresponding hydroxy acids formed according to the following equilibrium reactions:

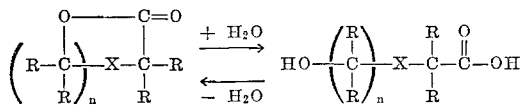

(wherein R, $n$ and X are as previously defined). Typical examples of suitable alkyl R groups (which may be the same or different) include methyl, ethyl, n-propyl, i-propyl, n-butyl, i-butyl, sec.-butyl and tert.-butyl groups. Lactones such as 3,5-dimethyl-2-para-dioxanone, 5-ethyl-2-para-dioxanone, β-propiolactone, γ-butyrolactone and δ-valerolactone, as well as the hydrolysis products of such lactones (especially the corresponding hydroxy substituted acids) may be used as decalcifying agents according to the process of the invention. As used herein, the term "decalcification" means that sufficient calcium has been removed from the specimen to provide a decalcified tissue which may be conveniently cut or sliced in relatively thin sections for microscopic, biological or pathological examination.

Typical hydrolysis equilibrium mixtures are represented by the following equations:

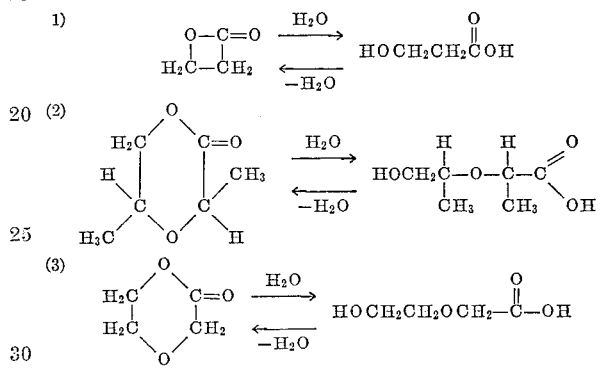

Lactones with rings containing from 4 to 6 atoms (and their hydrolysis products) form a preferred subclass of decalcifying agents.

The concentration of the lactone (or the equivalent amount of hydroxy acid theoretically obtainable by hydrolysis of this lactone to the acid form) in the decalcifying mixture is from about 1 mole to 10 moles of lactone per liter of decalcifying mixture (preferably from about 1.25 moles per liter to about 4.5 moles per liter) when aqueous compositions are employed. Below and above these limits, decalcification occurs, but at a much slower rate. The lactone (and/or their corresponding hydrolysis products) are most suitably employed in aqueous solutions. Other conventional fixative agents, preservatives, buffers and/or tissue staining materials may be incorporated into the lactone-containing bone decalcification composition. Aqueous or non-aqueous lactone solutions may be used. Water is preferred, but acetone, ethanol or isopropanol may also be employed as solvents. The decalcification of the bone specimens is generally complete in less than a two day period. A fixing agent such as formaldehyde, osmium tetroxide, alcohol or acetone may be used prior to or after treatment with the lactone (or lactone hydrolysis products). With the preferred concentrations and compositions of the invention, decalcification has been completed within a 6–8 hour period at room temperature to provide specimens which are easily sliced into very thin layers. Slicing may be accomplished with conventional apparatus such as a rotary or sliding microtome. Furthermore, the sliced sections do not show adverse effects when subsequently stained prior to a microscopic examination.

In a specific embodiment of the invention, a sample of bone from a specimen of the animal kingdom is immersed in an aqueous solution containing from 10 to 50 percent by weight of a lactone (such as 2-paradioxanone, beta-propiolacetone or the corresponding hydrolysis products: 2-hydroxyethoxyacetic acid and β-hydroxypropionic acid) to extract sufficient calcium to render the bone sample soft enough to be sliced in thin sections without fracturing. The lactone may be in the form of an aqueous equilibrium mixture with its hydrolysis products. All percents by weight are based upon the non-hydrolyzed lactone for consistency in reporting results. The time required to decalcify a bone or bone-like tissue to an extent which will permit precision cutting may vary somewhat with the type of tissue, the size of the sample and the amount of calcium initially present. Time periods of 2 days or less are generally sufficient for samples which are to be sliced for mounting and microscopic examination. The decalcified sample is removed from the aqueous lactone solution and then sliced, fixed, stained, mounted or otherwise prepared for further histologic or histochemical evaluation. When 2-para-dioxanone is employed, it is not always necessary to use an additional fixative since the dioxanone (and its hydrolysis products) possess preserving properties as disclosed in copending U.S. patent application Ser. No. 310,872, filed Sept. 23, 1963, now U.S. Patent No. 3,264,182. The extent of the calcium removal may be followed chemically (by analysis of the calcium concentration in the lactone medium surrounding the bone sample) or physically (by a gross physical examination of the bone for properties of pliability, softness and translucency).

The following examples are submitted for the purpose of illustration only and are not to be construed as limiting the scope of the invention in any way.

Examples I–X.—General method

Bone samples (taken from the shattered femur of a freshly killed rabbit and segments of intact rib from sheep) were weighed and a 300 milligram sample of rabbit bone tissue was immersed in 50 grams of treating solution. Bone samples of sheep rib were treated by immersing 1.3 grams of the rib in 200 grams of treating solution. The treating solutions were produced by adding varying amounts of lactones to water. The solutions therefore contained an equilibrium mixture of the lactone and its hydrolysis products. The amount of calcium in the solution surrounding the bone specimen was periodically determined to measure the increase in concentration as the decalcification proceeded. The calcium was determined using a Beckman Model DU flame spectrophotometer. The $Ca^{++}$ absorption was measured at 422 m$\mu$. All of the bone samples which were treated were satisfactory for histologic evaluation. Excellent nuclear detail is maintained when the decalcified samples are stained. The results are summarized in Table 1.

about 10 to 50 percent by weight), immersion after one or two days did not produce any increase in the calcium concentration of the liquid extraction medium surrounding each bone sample. This indicates that the major proportion of the calcium is removed in the initial stages of the decalcification process.

Sections of all of the decalcified sheep bones (intact rib segments) revealed an accentually uniform histologic appearance. The bony trabeculae stained brilliantly and normally. Cells within the bony lacunae were intact and showed the usual staining properties. Cells of the soft tissue of the bone marrow and adjacent periosteum were also intact and showed the usual staining properties when compared to control bone material which was subjected to nitric acid decalcificaton.

I claim as my invention:
1. A method of decalcifying a bone specimen which comprises:
   (a) contacting said bone specimen with an extracting solution containing a compound of the formula

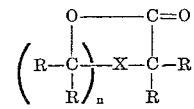

wherein
   (1) $n$ is an integer of from 0 to 3,
   (2) X is selected from the group consisting of the oxygen atom and the divalent group

(3) each R is a group of the formula $(C_kH_{2k})H$ in which $k$ is an integer of from 0 to 4, and
   (4) $n$ is greater than zero when X is oxygen,
and the hydrolysis products thereof, to form soluble calcium salts by extraction of the calcium within the bone specimen, and
   (b) separating the decalcified bone specimen of (a) from the solubilized calcium salts.
2. The method of claim 1 wherein the concentration of said compound is from about 10 percent by weight

TABLE 1

| Example Number | Treating Compound | Concentration of Treating Compound (Grams per 100 Grams of Solution) | Type of Bone Tissue | Calcium in Solution (Grams Per 100 Grams of Solution) After— | | | |
|---|---|---|---|---|---|---|---|
| | | | | 1 Day | 2 Days | 5 Days | 8 Days |
| I | None | 0 | Rabbit femur | 0.004 | | | 0.004 |
| II | 2-para-dioxanone | 10 | do | 0.10 | 0.11 | 0.12 | 0.12 |
| III | do | 25 | do | 0.14 | 0.14 | 0.14 | 0.14 |
| IV | do | 50 | do | 0.12 | 0.14 | 0.14 | 0.14 |
| V | do | 75 | do | 0.013 | 0.024 | 0.052 | 0.074 |
| VI | 3,5-dimethyl-2-para-dioxanone | 25 | Intact rib segments (sheep bones) | 0.12 | 0.13 | 0.13 | 0.14 |
| VII | 2-hydroxyethoxyacetic acid | 1 | do | 0.11 | 0.14 | 0.14 | 0.14 |
| VIII | do | 25 | do | 0.18 | 0.18 | 0.19 | 0.18 |
| IX | Propiolactone | 10 | do | 0.074 | 0.11 | 0.13 | 0.13 |
| X | do | 25 | do | 0.10 | 0.11 | 0.15 | 0.15 |

All of the bone samples which were treated with lactone (or the corresponding hydroxy acids) at a concentration of 10 to 50 percent by weight were flexible within 24 hours and could be cut with a disecting knife or a microtome. In most cases (using concentrations of from to about 50 percent by weight based upon the total weight of the extracting solution.
3. The method of claim 2 wherein the extracting solution contains water.
4. A method of preparing a bone specimen for precision slicing which comprises contacting said bone specimen with an aqueous decalcifying solution containing from about 10 percent to about 50 percent by weight of 2-para-dioxanone in equilibrium with its hydrolysis products and then removing the decalcified bone specimen from the aqueous decalcifying solution.

5. A method of placing a fresh bone specimen in condition for precision slicing which comprises contacting said bone specimen with an aqueous decalcifying solution containing from about 10 percent to about 50 percent by weight of β-propiolactone in equilibrium with its hydrolysis products and then removing the decalcified bone specimen from the aqueous decalcifying solution.

References Cited
UNITED STATES PATENTS 2,156,918    5/1939    Lyons _____ 167—65

OTHER REFERENCES

Lacroix, Canadian J. Med. Tech., vol. 22, September 1960, pp. 78–82, 85.

Moodycliffe, Canadian J. Med. Tech., vol. 22, September 1960, pp. 87–91.

ALBERT T. MEYERS, *Primary Examiner.*

A. FAGELSON, *Assistant Examiner.*